US007889084B2

(12) United States Patent
Mori

(10) Patent No.: US 7,889,084 B2
(45) Date of Patent: Feb. 15, 2011

(54) ID DETECTION DEVICE AND ID DETECTION METHOD

(75) Inventor: Hidekazu Mori, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 717 days.

(21) Appl. No.: 11/560,916

(22) Filed: Nov. 17, 2006

(65) Prior Publication Data

US 2007/0139161 A1 Jun. 21, 2007

(30) Foreign Application Priority Data

Dec. 20, 2005 (JP) ............................ 2005-366517

(51) Int. Cl.
*G08B 13/14* (2006.01)
*G06F 7/00* (2006.01)

(52) U.S. Cl. .................................... 340/572.7; 700/215

(58) Field of Classification Search ... 340/572.1–572.9, 340/10.1, 10.2, 541; 700/215
See application file for complete search history.

(56) References Cited

U.S. PATENT DOCUMENTS 6,354,493 B1 * 3/2002 Mon .......................... 235/380
7,102,523 B2 * 9/2006 Shanks et al. ............ 340/572.7
7,132,945 B2 * 11/2006 Dunlap, Jr. ............... 340/572.1
7,176,799 B1 * 2/2007 Golicz et al. ............. 340/572.1
7,424,974 B2 * 9/2008 Hull et al. ................... 235/385
7,511,601 B2 * 3/2009 Eisenberg et al. .......... 340/3.51
2004/0212500 A1 * 10/2004 Stilp .......................... 340/541
2005/0043854 A1 * 2/2005 Dunlap, Jr. .................. 700/215
2005/0205673 A1 * 9/2005 Morris et al. ............... 235/385
2006/0068711 A1 * 3/2006 Chiu et al. ................. 455/67.7
2007/0096879 A1 5/2007 Mori

FOREIGN PATENT DOCUMENTS

JP 2002-337827 * 11/2002
JP 2005-005876 1/2005
JP 2005-094474 4/2005
JP 2005-135354 5/2005

* cited by examiner

*Primary Examiner*—Benjamin C Lee
*Assistant Examiner*—Sigmund Tang
(74) *Attorney, Agent, or Firm*—Turocy & Watson, LLP

(57) ABSTRACT

An ID detection device includes a transmit/receive antenna unit having a transmit/receive antenna and a movement mechanism for making the transmit/receive antenna scan, wherein a file folder in which the RFID tags are arranged close to one another in a row is set on the transmit/receive antenna unit, to make the transmit/receive antenna scan in a row direction in which the RFID tags are arranged.

6 Claims, 2 Drawing Sheets

ID DETECTION DEVICE AND ID DETECTION METHOD

CROSS REFERENCES TO RELATED APPLICATIONS

This application is based upon and claims the benefit of priority from the prior Japanese Patent Application No. 2005-366517, filed on 20th Dec. 2005, the entire contents of which are incorporated herein by reference.

BACKGROUND OF THE INVENTION

1. Field of the Invention

The present invention relates to a detection device and a detection method for reading an ID of an RFID tag, and particularly to an ID detection device and an ID detection method for steadily reading information from plural RFID tags closely lined up one another.

2. Description of the Related Art

In recent years, wireless data carriers of a certain kind or so-called RFID tags have come into use. In each of those RFID tags, a unique ID is set, an information-rewritable memory area is included, and reading of the ID and/or writing and reading of arbitrary information can be wirelessly carried out without contact.

For example, RFID tags having unique IDs are bonded to or incorporated into posted goods or delivered goods, respectively, to identify individual moving goods. If IDs of a large number of RFID tags can be read all at once, efficiency of identification work improves. A method has hence been proposed (e.g., Jpn. Pat. Appln. Laid-Open Publication No. 2005-135354). In the method, for example, posted goods or the like with RFID tags attached are put in a predetermined contained box such that the RFID tags are arranged in a row with their own maximum gain directions aligned with one another. This container box and a transmission/reception antenna (RW antenna) are positioned such that the aligned maximum gain directions of the RFID tags and a maximum gain direction of the transmission/reception antenna are parallel to one another. Thus, the IDs of the large number of RFID tags are read all at once.

There has been another proposal (e.g., Jpn. Pat. Appln. Laid-Open Publication No. 2005-5876) for a method in which a container box containing plural posted goods with RFID tags attached is opposed to a transmission/reception antenna, to read IDs of the plural RFID tags all at once. In the method, a reflection plate is positioned to be opposed to the transmission/reception antenna, to reflect an inquiry electric wave radiated from the transmission/reception antenna. Thus, a radiation area of the inquiry electric wave is extended to be broader than an identifiable area.

According to the techniques described above, however, the inquire electric wave can hardly enter into between crowded wireless tags if a lot of wireless tags are arranged close to one another. In particular, there are serious difficulties in reading an ID of an RFID tag positioned in the center of those crowded tags.

BRIEF SUMMARY OF THE INVENTION

It is an object of the present invention to provide an ID detection device for reading IDs of individuals of plural RFID tags which are arranged close to one another forming a row of tags.

In an aspect of the present invention, the ID detection device includes: a transmit/receive antenna unit having a transmit/receive antenna and a movement mechanism for making the transmit/receive antenna scan, wherein a file folder in which the RFID tags are arranged close to one another in a row is set on the transmit/receive antenna unit, to make the transmit/receive antenna scan in a row direction in which the RFID tags are arranged.

DETAILED DESCRIPTION OF THE INVENTION

Throughout this description, the embodiment and examples shown should be considered as exemplars, rather than limitations on the apparatus and methods of the present invention.

Figure 1:
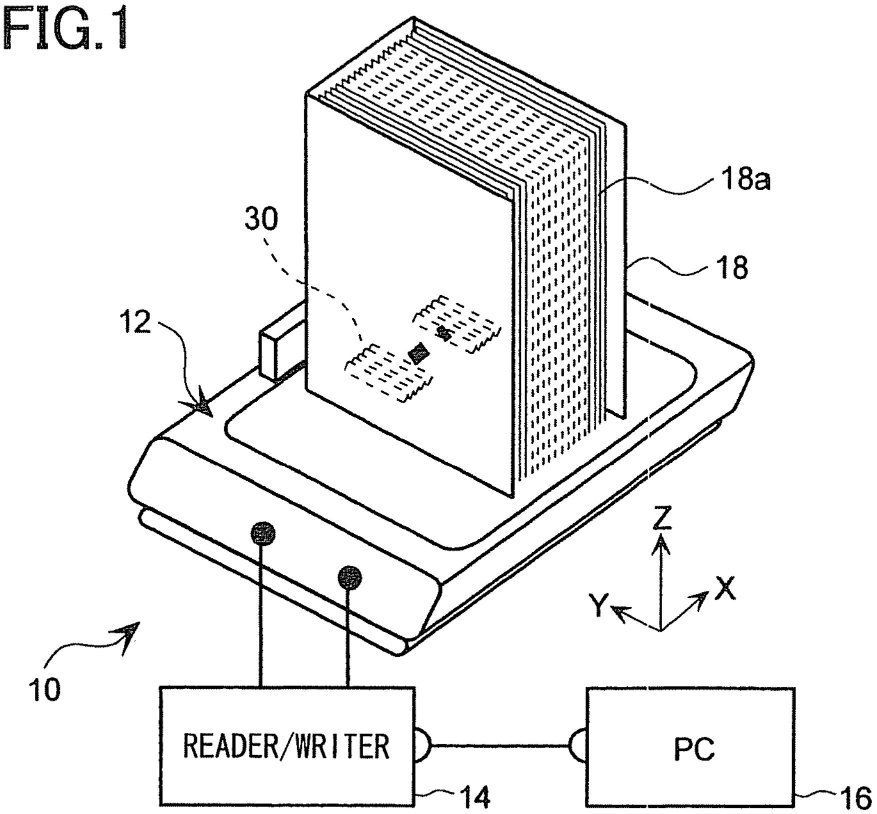
FIG. 1 is a schematic view of an ID detection device according to an embodiment of the present invention.

An embodiment of the present invention will now be described with reference to the drawings. FIG. 1 shows a schematic structure of an ID detection device 10. This ID detection device 10 has a transmit/receive antenna (RW antenna) unit 12, a reader/writer 14, and a superior control device such as a personal computer (PC) 16 or the like.

On the upper face of the transmit/receive antenna unit 12, a file folder 18 containing plural RFID tags 30 is set. The file folder 18 binds, for example, plural sheets **18*a* to each of which an RFID tag 30 is bonded at a predetermined position, thereby to form a tag row constituted by RFID tags 30 arranged close to one another in a row. The RFID tags 30** are oriented in an X direction as the aligned direction of the tags.

Although the drawings do not depict a structure of the RFID tag 30 in detail, the RFID tag 30 is a kind of wireless data carrier and is an independent component integrating a tag antenna capable of performing transmission and reception and an IC chip together on a board. The IC chip is provided with: a power generation section which rectifies and stables a modulated electric wave received by the tag antenna to supply power to respective parts of the IC chip; a demodulation section which demodulates the modulated electric wave and sends the demodulated wave to a control section; a modulation section which modulates data sent from the control section and sends the modulated data to the tag antenna; a control section and a memory which write the data demodulated by the demodulation section into a memory and read transmission data from the memory and send the read data to the modulation section.

The memory includes an ID area for storing a unique ID assigned and set by a manufacturer in a stage of manufacturing the RFID tag 30, and a user area where the user can write arbitrary data. Tracking management codes respectively unique to the sheets **18*a* to which the RFID tags 30** are bonded are recorded in the user areas.

In a state shown in FIG. 1, a maximum gain direction of the RFID tags 30 is a vertical direction (direction Z).

Figure 2:
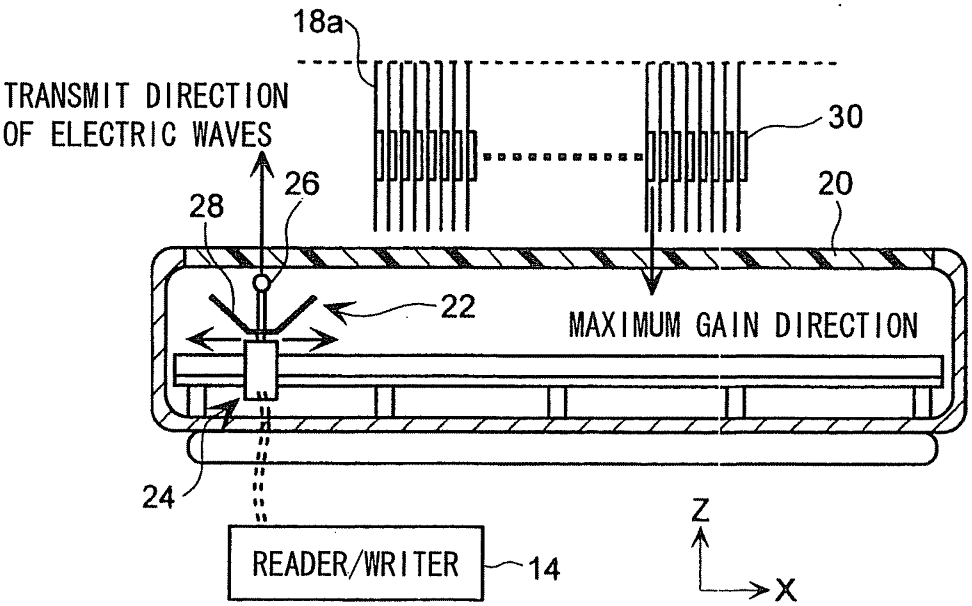
FIG. 2 is a schematic cross-sectional view of a transmit/receive antenna unit.

The transmit/receive antenna unit 12 is to read memory data in non-contact fashion from RFID tags 30 existing in its communication area. FIG. 2 shows a schematic cross-sectional view of the antenna unit. The transmit/receive antenna unit 12 has a structure in which a transmit/receive antenna 22 and a movement mechanism 24 to linearly reciprocate the transmit/receive antenna 22 are provided inside a housing 20.

Figure 3:
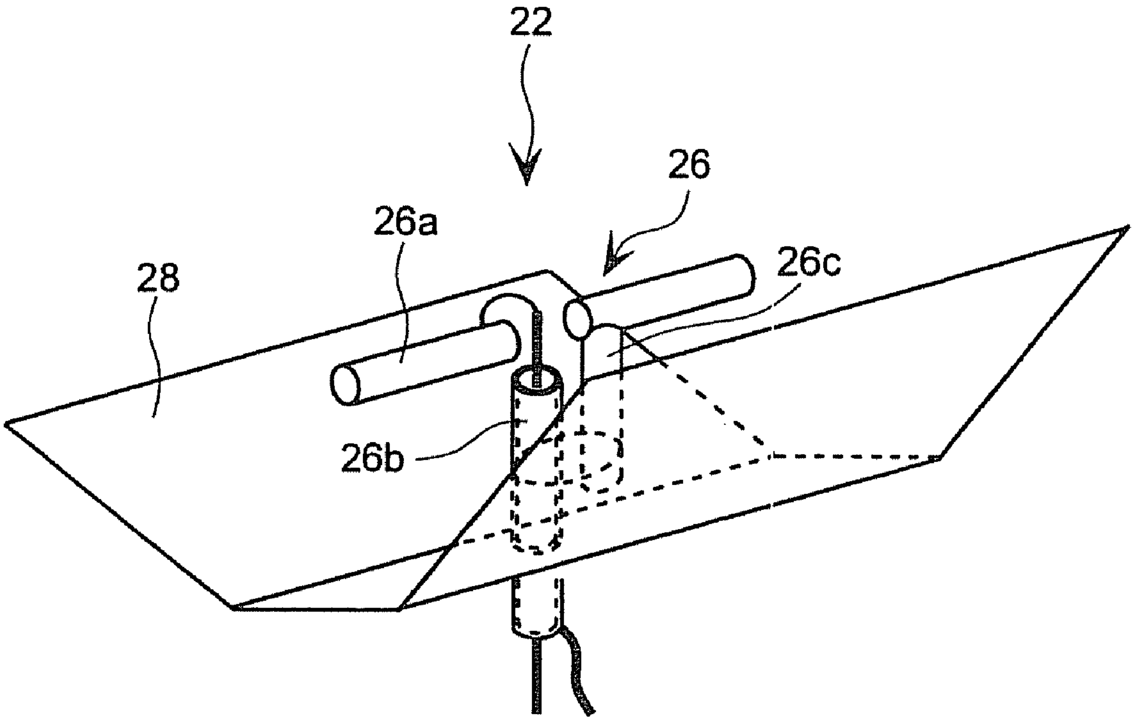
FIG. 3 is a perspective view showing a structure of the transmit/receive antenna unit.

FIG. 3 is a perspective view showing a structure of the transmit/receive antenna 22 in further detail. The transmit/receive antenna 22 is a so-called corner reflector antenna which is constituted by a dipole antenna unit 26 and a reflection plate (reflector part) 28. The dipole antenna unit 26 has a metal rod 26*a* extending in a Y direction, a support rod 26*b* supporting the metal rod 26*a*, and a balun (balanced-unbalanced converter) 26*c*.

The metal rod 26*a* which transmits/receives electric waves has an outer diameter set to a suitable value for a frequency band of an electric wave to read IDs of RFID tags 30. The metal rod 26*a* may be solid or hollow (cylindrical). A semi-rigid or coaxial cable is used for the support rod 26*b*.

Incidentally, the RFID tags 30 contained in the file folder 18 use the same frequency band. If there is another file folder which contains other wireless tags that use a different frequency band and IDs are read from these other RFID tags, a transmit/receive antenna including a dipole antenna having a metal rod whose outer diameter is suitable for the different frequency band of those RFID tags is preferably used.

The reflection plate 28 has a function of improving a gain and is made of a material which reflects electric waves. Usually, the reflection plate 28 is a metal plate. Angles of both wings of the reflection plate 28 need to be steep in case of raising directivity. That is, the angles to the horizontal plane (X-Y plane) need to be increased in FIG. 2. This kind of reflection plate 28 has an advantage that manufacture thereof is easy. The reflection plate need not have a horizontal bottom as shown in FIGS. 2 and 3 but may be substantially V-shaped. An alternative having a curved face such as an elliptically curved face may be used as the reflection plate.

The transmit direction of electric waves from the transmit/receive antenna unit 12 which is the maximum gain direction is an upward vertical direction. Therefore, an upper face of the housing 20 is made of an electric wave permeable material, such as glass or resin. Since the maximum gain direction of the RFID tags 30 and the transmit direction of electric waves from the transmit/receive antenna unit 12 are thus set parallel to one another, failures in reading IDs can be prevented.

Various mechanisms such as a linear motor, linear air slider, linear belt slider, and ball screw are available for the movement mechanism 24. The movement mechanism 24 is capable of reciprocating the transmit/receive antenna 22 in the X direction.

The reader/writer 14 includes: a control section constituted by a CPU for controlling communication with the RFID tags 30 and the like, a ROM which stores operation programs, a RAM which temporarily stores data, and so forth; a modulation section which modulates data given from the control section into a modulated signal suitable for wireless communication; a transmit amplifier which amplifies the modulated signal and radiates the signal as an electric wave through the transmit/receive antenna unit 12; a receive amplifier which amplifies an electric wave signal received through the transmit/receive antenna unit 12; and a demodulation section which demodulates data from the amplified electric wave signal and supplies the data to the control section.

To communicate with the RFID tags 30, at first, a carrier signal is modulated by the transmit section and transmitted as a power electric wave signal from the transmit antenna. Thereafter, data to be transmitted is modulated by the transmit section to be superimposed on the power electric wave signal, and is transmitted through the transmit/receive antenna 22.

The ID detection device 10 thus constructed makes the transmit/receive antenna 22 scan from an end to the other end in the X direction while sending an electric wave to read wireless IDs of RFID tags 30 from the transmit/receive antenna 22 as previously shown in FIG. 2. In this manner, IDs are sequentially read from those RFID tags 30 that have received the electric wave from the transmit/receive antenna 22.

According to the communication method based on the transmit/receive antenna unit 12 and IDs, electric waves can enter into between RFID tags 30 even if the RFID tags 30 are crowded forming a row of RFID tags. Therefore, failures in reading the RFID tags can be prevented. In addition, IDs can be read correctly.

The present invention is not limited to the embodiment just as what has been described above. Constituent elements of the invention may be modified in practical stages of realizing the invention without deviating from the scope of the invention. Further, various inventions can be derived from appropriate combinations of plural ones of the constituent elements disclosed in the above embodiment. For example, several constituent elements may be removed from all the constituent elements disclosed in the embodiment.

For example, in the above embodiment, the transmit/receive antenna 22 slides in a state where the file folder in which a row of RFID tags is formed is set on the upper face of the housing of the transmit/receive antenna unit 12. Inversely, in a state where the transmit/receive antenna 22 is fixed, an inspection target in which a row of RFID tags is formed may pass at a constant speed through a particular area provided at a predetermined distance from the transmit/receive antenna 22.

What is claimed is:

1. An ID detection device configured to read IDs of individuals of plural RFID tags which are arranged close to one another forming a row of tags, comprising:
- a transmit/receive antenna unit comprising:
  - a transmit/receive antenna configured to communicate with the RFID tags;
  - a movement mechanism configured to reciprocate the transmit/receive antenna scan in a row direction in which the RFID tags are arranged,
  - wherein a file folder binds a plural of sheets to each of which the RFID tag is bonded at a predetermined position to form a tag row constituted by the RFID tags arranged close to one another in a row is placed on the transmit/receive antenna unit so that the movement mechanism reciprocates the transmit/receive antenna linearly in a row direction in which the RFID tags are arranged to communicate with the RFID tags, and
  - wherein the transmit/receive antenna has a dipole antenna unit and a reflector part cooperating such that a transmit direction of an electric wave from the transmit/receive antenna and a maximum gain direction of the RFID tags are parallel to one another.

2. The ID detection device according to claim 1, wherein the reflector part is a corner reflector.

3. The ID detection device according to claim 1, wherein thickness of the dipole antenna is set suitable for a frequency band of an electric wave to read the IDs of the RFID tags.

4. The ID detection device according to claim 2, wherein thickness of the dipole antenna is set suitable for a frequency band of an electric wave to read the IDs of the RFID tags.

5. An ID detection method for reading IDS of individuals of plural RFID tags bonded to plural sheets and are arranged close to one another forming a row of tags, comprising:
- organizing the RFID tags on the plural sheets with file folders such that a transmit direction of an electric wave from a transmit/receive antenna and a maximum gain direction of the RFID tags are parallel to one another, so that the RFID tags can be scanned in the row direction by a transmit/receive antenna unit having the transmit/receive antenna and a movement mechanism when the file folders having the tagged sheets are placed in a row on the transmit/receive antenna unit;

scanning by the movement mechanism the transmit/receive antenna including a dipole antenna and a reflector linearly in a row direction in which the wireless tags are arranged, and reciprocating by the movement mechanism the transmit/receive antenna linearly in the row direction in which the RFID tags are arranged.

6. The wireless ID detection method according to claim 5, further comprising the steps of;

setting a maximum gain direction of the plural RFID tags is a direction perpendicular to the row direction of the RFID tags; and adjusting a transmit direction of an electric wave from the transmit/receive antenna to the same as the maximum gain direction of the RFID tags.

* * * * *